Patented Apr. 10, 1951

2,548,803

UNITED STATES PATENT OFFICE 2,548,803

CATALYTIC PROCESS

Ernest L. Little, Jr., Wilmington, Del., assignor to E. I du Pont de Nemours & Company, Wilmington, Del., a corporation of Delaware No Drawing. Application June 27, 1950, Serial No. 170,699

8 Claims. (Cl. 260—666)

1

This invention relates to the alkylation of hydrocarbons and more particularly to the alkylation of certain cyclic unsaturated hydrocarbons with monoolefins.

Previously known methods for the alkylation of carbocyclic compounds involve the use of acidic catalysts. Such methods, in general, bring about reactions involving the cyclic structure and in many instances lead to secondary rearrangements of the resulting ring substituted alkyl groups introduced in the alkylation step. More recently (U. S. Patent 2,448,641), a new method has been discovered for the alkylation of cyclic unsaturated hydrocarbons with olefins by heating the cyclic unsaturated hydrocarbon with the desired monoolefinic hydrocarbon at temperatures from 150 to 450° C. under superatmospheric pressures in the presence of 0.1 to 20% of an alkali metal as catalyst, based on the weight of the cyclic unsaturated hydrocarbon.

Although the method of Patent 2,448,641 works well, it has the disadvantage of requiring elevated operating temperatures, which, in conjunction with the required superatmospheric pressures, necessitate the use of the extremely expensive type of equipment needed to withstand these high pressures at the elevated temperatures. Furthermore, the high operating temperature conditions make the process more expensive as well as inconvient and undesirable, especially with regard to continuous operations.

It is an object of this invention to provide a novel method for alkylating certain cyclic unsaturated hydrocarbons with monoolefins. A further object is to provide a novel catalytic method for alkylating certain cyclic unsaturated hydrocarbons with monoolefins at relatively low temperatures. A still further object is to provide a catalytic method for the preferential alkylation in the side chain of alkyl substituted aromatic hydrocarbons and of hydroaromatic compounds, such as cyclohexene, on methylene carbons alpha to the nuclear double bond. Other objects will appear hereinafter.

The objects of this invention are accomplished by the following invention of a process which comprises bringing into contact in a reaction zone and reacting, at a temperature of 0° to 130° C. under superatmospheric pressure of 100 to 3000 atmospheres in the presence of an organo-alkali metal catalytic compound, a monoolefinic hydrocarbon with a cyclic unsaturated hydrocarbon wherein the unsaturation is present solely in the ring and which cyclic unsaturated hydrocarbon contains at least one hydrogen atom directly

2 attached to a saturated carbon atom which is singly bonded to a ring carbon atom which in turn is doubly bonded to one of its adjacent ring carbon atoms.

It has now been found that cyclic unsaturated hydrocarbons containing at least one hydrogen-bearing, saturated carbon singly bonded to a nuclear carbon which, in turn, is doubly bonded to one of its neighboring nuclear carbons, can be alkylated on said saturated carbon by reaction with at least one monoolefinic hydrocarbon at temperatures from 0° C. to 130° C., preferably from 35 to 70° C., under superatmospheric pressure, preferably from 100 to 3000 atmospheres or higher, in the presence of 0.1 to 20% of an organo-alkali metal compound, preferably a hydrocarbo-alkali metal compound, as catalyst. "Saturated carbon" includes both aliphatic and cycloaliphatic carbons which carry only single bonds, i. e., are free of aliphatic unsaturation.

The reactants to which the process of this invention is applied comprise at least one monoolefinic hydrocarbon, an organo-alkali metal compound as catalyst, and at least one unsaturated carbocyclic compound wherein the unsaturation is present solely in the ring and which contains singly bonded to nuclear carbon at least one hydrogen bearing, saturated carbon, said nuclear carbon being doubly bonded to one of its neighboring carbons in the ring.

The reactants may be brought into mutual contact in a reaction zone in any order of addition and may be preheated or not, separately or mixed, before reaching the reaction zone. The following, more detailed description illustrates one specific manner of carrying out the batch-wise operation of the process of this invention.

A pressure resistant reaction vessel is charged with the desired cyclic unsaturated hydrocarbon compound and organo-alkali metal catalytic compound. This charging operation is preferably carried out after purging the reaction vessel of air with deoxygenated nitrogen or other inert gas. In order to prevent entrance of air, the charging is usually conducted under a blanket of inert gas. Alternatively, the reaction charge can be pressured into the closed and previously evacuated reaction vessel. The vessel is then closed and evacuated, if this has not already been done, placed in a shaker machine, provided with a heater, and connected to a reservoir of monoolefinic hydrocarbon or mixtures thereof under pressure. Controlling and recording thermocouples are placed in position, the vessel pressured to the desired point with the monoolefinic hydrocarbon being used, and heating and agitation started.

The course of the reaction may be followed by the pressure drop due to utilization of the monoolefinic hydrocarbon. The pressure may be maintained in the desired range by any one of the several means, such as, by intermittent addition of the monoolefinic hydrocarbon from high pressure storage as needed, or by injecting further quantities of the cyclic unsaturated hydrocarbon, or by injecting a mixture of the monoolefinic hydrocarbon and the cyclic unsaturated hydrocarbon preferably under pressure. At the end of the reaction, which is determined by a cessation of pressure drop, the vessel is cooled, bled to atmospheric pressure, opened and the reaction mixture discharged. The catalyst is separated by filtration in those instances wherein it is insoluble and the products isolated by known means, usually by fractional distillation.

The following examples, in which the parts given are by weight and the boiling points are at atmospheric pressure, serve to illustrate and not to limit the process of this invention.

*Example I*

A stainless steel, high pressure reactor of internal capacity corresponding to 400 parts of water is charged with 9 parts of benzylsodium and 87 parts of freshly distilled toluene. The reactor is then closed, flushed with nitrogen, and connected to a source of ethylene under pressure. The reactor is heated to 60° C. and maintained at this temperature for a period of 16 hours under a pressure of 200 atmospheres of ethylene. This pressure is maintained during the reaction period by intermittent pressuring with ethylene as needed. At the end of this time, the reactor is cooled to room temperature, bled to atmospheric pressure, opened and the reaction mixture removed. Upon fractional distillation, unreacted toluene is removed, B. P. 109–111° C. Continued fractionation yields 41 parts (36.4% yield) of n-propylbenzene, B. P. 155° to 160° C., $n_D^{25}$ 1.4887 and 40.2 parts (35.6% yield) of 3-phenylpentane, B. P. 183° to 186° C., $n_D^{25}$ 1.4859.

Another experiment carried out in the same general fashion at an operating temperature of 38° C. and under a pressure of 140 atmospheres of ethylene produces 3.6 parts (3.2%) of n-propylbenzene, $n_D^{25}$ 1.4890.

*Example II*

A stainless steel reaction vessel similar to that described in Example I is charged with 100 parts of toluene, 62.5 parts of a petroleum ether of boiling range 26° C. to 31° C. and 7.5 parts of amylsodium. The reactor is closed, flushed with nitrogen and connected to a source of ethylene under pressure. The reactor is then heated to 60° C. and maintained at this temperature for 16 hours under a pressure of 200 atmospheres of ethylene. At the end of this time, the reactor is cooled to room temperature, bled to atmospheric pressure, opened and the reaction mixture removed. The petroleum ether reaction medium and unreacted toluene are removed by fractional distillation. Continued fractionation yields 44 parts (38.8% yield) of n-propylbenzene, B. P. 155° to 160° C.

Another similar experiment carried out in the same general fashion except that the operating temperature is 55° C. and the operating pressure is 315 atmospheres of ethylene produces 34.5 parts (30.4% yield) n-propylbenzene, B. P. 155° to 160° C.

*Example III*

A stainless steel reactor similar to that described in Example I is charged with 100 parts of toluene, 10 parts of metallic sodium and four parts of diphenylmercury, the latter two reactants forming the organo-sodium catalyst, phenylsodium, in situ. The reactor is closed, flushed with nitrogen and connected to a source of ethylene under pressure. The reactor is then heated to 65° C. and maintained at this temperature for 16 hours under a pressure of 350 atmospheres of ethylene. At the end of this time, the reactor is cooled to room temperature, bled to atmospheric pressure, opened and the reaction mixture removed. The unreacted sodium is removed by filtration, diphenylmercury and any by-product mercury are removed by filtration. Unreacted toluene is removed from the reaction mixture by fractional distillation. Continued fractionation yields 8.8 parts (6.7% yield) of n-propylbenzene, B. P. 155° to 158° C.

As pointed out herein, it is necessary to carry out the process of this invention under superatmospheric pressures; hence, the operating equipment will include the normally used pressure resistant reaction vessels equipped with agitators, if desired, and heating elements, as well as pumps, compressors and the like for attaining the desired reaction pressures. If desired, particularly in the case of continuous operations, other pumps or injectors may be provided for adding solutions or suspensions of the organo-alkali compound catalyst or additional cyclic unsaturated hydrocarbons to the reaction zone.

The aromatic and hydroaromatic hydrocarbons used in the process of this invention are those having at least one hydrogen on a saturated carbon which is directly attached by a single bond to a nuclear carbon atom which, in turn, is doubly bonded to one of its adjacent nuclear carbon atoms. Specific compounds of this class include toluene, ethylbenzene, n-propylbenzene, n-butylbenzene, n-amylbenzene, the xylenes, tetrahydronaphthalene, methylnaphthalene, mesitylene, cyclohexene, 3-methylcyclohexene-1, 3-ethylcyclohexene-1, 3-propylcyclohexene-1, 9,10-dihydrophenathrene, diphenylmethane, phenylcyclohexylmethane, 1,2-dihydrobenzene, 1,4-dihydrobenzene, cyclopentadiene and the like.

Suitable examples of the nonoolefinic hydrocarbons, that is olefinic hydrocarbons wherein the sole unsaturation is a single ethylenic double bond, which can be used in the process of this invention are ethylene, propene-1, butene-1, butene-2, octene-1, octene-2, and the like, particularly those monoolefins which contain a terminal methylene group. The process of this invention is particularly outstanding when applied to the lower monoolefins of up to six carbons, particularly those which are normally gaseous.

The monoolefins may contain small amounts of contaminants normally encountered in them as available commercially. Such contaminants may include the corresponding saturated hydrocarbons such as ethane, propane and the like, nitrogen, hydrogen, carbon dioxide or oxygen. However, oxygen in concentrations above 1,000 parts per million is detrimental to the reaction. Consequently, monoolefins purified to contain less than 100 parts per million, generally less than 50 parts per million, and preferably less than 10 parts per million are employed. The monoolefins may be conveniently purified, if desired, by scrubbing or by catalytic removal of the impurities.

At least one mole of the monoolefin is theoretically required per reactive hydrogen in the aromatic or hydroaromatic hydrocarbon to obtain complete alkylation. In actual practice, however, an excess of the monoolefin is usually maintained in the reaction mixture. It is possible, of course, also to operate under conditions wherein the monoolefin is in the minority, i. e., where an excess of the aromatic or hydroaromatic hydrocarbon is maintained. Such conditions tend to favor formation of the monoalkylated product. In this connection it should be pointed out, for instance, as illustrated in Example I that the alkylation of aromatic or hydroaromatic compounds containing more than one hydrogen on the carbon singly bonded to the nuclear carbon which is, in turn, doubly bonded to one of its neighboring nuclear carbons may continue until all the hydrogens on said singly bonded carbon are replaced by the reacting monoolefin, i. e., are alkylated. Thus, in alkylating toluene with ethylene, three products are theoretically possible, i. e., n-propylbenzene, 3-phenylpentane, 3-ethyl-3-phenylpentane.

As catalysts for the reaction, there can be used any organo-alkali metal compound, i. e., any organic derivative of an alkali metal. Because of readier availability and the fact that less side reactions are engendered thereby, it is preferred to use the hydrocarboalkali metal compounds, i. e., solely hydrocarbon derivatives of the alkali metals. Particular examples of these catalytic materials are the alkali metal alkyls, (the alkyls of elements of group I–A of the periodic table), e. g., amylpotassium, methylsodium, ethylsodium, butyllithium, isoamylsodium, dodecylsodium, ethylcesium; the alkali metal aryls (the aryls of elements of group I–A), e. g., phenylsodium, phenyllithium; the alkali metal aralkyls (the aralkyls of elements of group I–A), e. g., benzylsodium, phenylisopropylsodium, phenylisopropylpotassium, benzyllithium, and the like. The hydrocarbon alkali metal complexes may also be used such as, for instance, sodium anthracene, sodium acridine, and the like.

These hydrocarbo-alkali metal catalysts can also be prepared in situ by charging the respective alkali metal and a hydrocarbo derivative of a metal other than an alkali metal which react together to form the corresponding hydrocarboalkali metal compound. For instance, the catalyst used in the process of this invention may be prepared in situ by charging metallic sodium, lithium or potassium in conjunction with diphenylmercury, tetraphenyltin, diethylzinc, or triphenylboron. These hydrocarbo-alkali metal catalysts may also be prepared in situ by charging the alkali metal, such as sodium, and tetraphenylethylene. Because of their lower cost and greater availability, the hydrocarbo-sodium compounds are particularly preferred. The amount of catalyst used will generally vary from 0.10–20.0% by weight of the cyclic unsaturated hydrocarbon which is being alkylated and preferably from 2 to 10% on the same basis.

The temperatures and pressures employed in the practice of this invention are interdependent variables. As a rule, the process is operated at temperatures within the range 0° to 130° C., preferably at temperatures in the range of 35° to 70° C., and at superatmospheric pressures in the range 100 to 3000 atmospheres or higher. Because of the extra costs involved, it is preferred not to operate below room temperature. In view of the favorable influence of high pressures on the rates of reactions, the pressures usually employed in practice range from about 150 to 1000 atmospheres or higher.

The nature of the products of the reaction, as well as the relative efficiency of the process, depends to some extent upon the pressure and temperature conditions employed, as well as on the nature of the specific hydrocarbo-alkali metal catalyst used. Thus, as illustrated in Example I, the alkylation of toluene with ethylene at 60° C. and 200 atmospheres pressure using benzylsodium as catalyst yields both n-propylbenzene and 3-phenylpentane in a total yield of approximately 72%; whereas, the same alkylation at 38° C. under only 140 atmospheres ethylene pressure yields only n-propylbenzene in approximately 1/20 of the total previously given yields. Similarly, as illustrated in Example II, the alkylation of toluene with ethylene using amylsodium as catalyst proceeds at 60° C. under 200 atmospheres ethylene pressure to give n-propylbenzene in about 39% yeld. This same alkylation carried out at only 55° necessitates higher operating ethylene pressures, specifically 315 atmospheres to obtain a 30.4% yield of the same product.

The process of this invention is particularly valuable for the preferential alkylation in the side chain of alkyl substituted aromatic hydrocarbons. The alkylated compounds produced by the present process are valuable in motor fuels and as intermediates in chemical syntheses. The alkylation of hydroaromatic compounds such as, cyclohexene on methylene carbons alpha to the nuclear double bond provides a novel route to alkyl-substituted cyclic olefins which are particularly suitable for chemical conversion through oxidation to branched chain dicarboxylic acids; which are of outstanding utility in the preparation of film- and fiber-forming polyamides and other condensation polymers.

As many apparently widely different embodiments of this invention may be made without departing from the spirit and scope thereof, it is to be understood that this invention is not limited to the specific embodiments thereof except as defined in the appended claims.

I claim:

1. A process for the preferential alkylation of cyclic unsaturated hydrocarbons which comprises bringing into contact in a reaction zone and reacting, at a temperature of 0° to 130° C. under superatmospheric pressure of 100 to 3000 atmospheres in the presence of an organo-alkali metal catalytic compound, a monoolefinic hydrocarbon with a cyclic unsaturated hydrocarbon wherein the unsaturation is present solely in the ring and which contains at least one hydrogen atom directly attached to a saturated carbon atom which is singly bonded to a ring carbon atom which is in turn doubly bonded to one of its adjacent ring carbon atoms.

2. A process for the preferential alkylation of cyclic unsaturated hydrocarbons which comprises bringing into contact in a reaction zone and reacting, at a temperature of 0° to 130° C. under superatmospheric pressure of 100 to 3000 atmospheres in the presence of a hydrocarboalkali metal catalytic compound, a monoolefinic hydrocarbon with a cyclic unsaturated hydrocarbon wherein the unsaturation is present solely in the ring and which contains at least one hydrogen atom directly attached to a saturated carbon atom which is singly bonded to a ring carbon atom which in turn is doubly bonded to one of its adjacent ring carbon atoms.

3. A process for the preferential alkylation of cyclic unsaturated hydrocarbons as set forth in claim 2 wherein said hydrocarbo-alkali metal catalytic compound is an alkali metal alkyl catalytic compound.

4. A process for the preferential alkylation of cyclic unsaturated hydrocarbons as set forth in claim 2 wherein said hydrocarbo-alkali metal catalytic compound is an alkali metal aryl catalytic compound.

5. A process for the preferential alkylation of cyclic unsaturated hydrocarbons as set forth in claim 2 wherein said hydrocarbo-alkali metal catalytic compound is an alkali metal aralkyl catalytic compound.

6. A process for the preferential alkylation in the side chain of alkyl-substituted aromatic hydrocarbons which comprises bringing into contact in a reaction zone and reacting, at a temperature of 35° to 70° C. under superatmospheric pressure of 150 to 1000 atmospheres in the presence of a hydrocarbo-sodium catalytic compound, a monoolefinic hydrocarbon with an alkyl-substituted aromatic hydrocarbon wherein the unsaturation is present solely in the ring and which contains at least one hydrogen atom directly attached to a saturated carbon atom which is singly bonded to a ring carbon atom which is in turn doubly bonded to one of its adjacent ring carbon atoms.

7. A process for the preferential alkylation in the side chain of alkyl-substituted aromatic hydrocarbons which comprises bringing into contact in a reaction zone and reacting, at a temperature of 35° to 70° C. under superatmospheric pressure of 150 to 1000 atmospheres in the presence of a hydrocarbo-sodium catalytic compound, ethylene with an alkyl-substituted aromatic hydrocarbon wherein the unsaturation is present solely in the ring and which contains at least one hydrogen atom directly attached to a saturated carbon atom which is singly bonded to a ring carbon atom which is in turn doubly bonded to one of its adjacent ring carbon atoms.

8. A process for the preferential alkylation in the side chain of alkyl-substituted aromatic hydrocarbons which comprises bringing into contact in a reaction zone and reacting, at a temperature of 35° to 70° C. under superatmospheric pressure of 150 to 1000 atmospheres in the presence of a hydrocarbo-sodium catalytic compound, ethylene with toluene.

ERNEST L. LITTLE, Jr.

No references cited.